(12) United States Patent
Hyde et al.

(10) Patent No.: US 9,905,072 B2
(45) Date of Patent: *Feb. 27, 2018

(54) VENDING DEVICES HAVING AD-WATCHING AS CONSIDERATION

(71) Applicant: Elwha LLC, Bellevue, WA (US)

(72) Inventors: Roderick A. Hyde, Redmond, WA (US); Muriel Y. Ishikawa, Livermore, CA (US); Edward K. Y. Jung, Bellevue, WA (US); Jordin T. Kare, Seattle, WA (US); Royce A. Levien, Lexington, MA (US); Richard T. Lord, Gig Harbor, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US); Charles Whitmer, North Bend, WA (US); Lowell L. Wood, Jr., Bellevue, WA (US); Victoria Y. H Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/292,590

(22) Filed: May 30, 2014

(65) Prior Publication Data
US 2014/0350721 A1   Nov. 27, 2014

Related U.S. Application Data

(63) Continuation of application No. 13/136,504, filed on Aug. 1, 2011, now Pat. No. 8,751,038.

(51) Int. Cl.
G07F 9/02 (2006.01)
G07F 15/00 (2006.01)
G06Q 30/02 (2012.01)

(52) U.S. Cl.
CPC ......... G07F 9/023 (2013.01); G06Q 30/0268 (2013.01); G07F 15/003 (2013.01); G07F 15/006 (2013.01)

(58) Field of Classification Search
USPC ................................ 700/236, 237, 238, 240
See application file for complete search history.

(56) References Cited

U.S. PATENT DOCUMENTS 3,213,994 A   10/1965   Hohler
4,184,580 A   1/1980   Ellis
(Continued)

Primary Examiner — Timothy Waggoner

(57) ABSTRACT

Systems and methods for vending devices having ad-watching as consideration are described. In some implementations, a vending apparatus includes a dispensing portion operable to dispense a product (e.g. electricity) to a user; a communication portion operable to provide a communicable content (e.g. an advertisement) to the user; and a control system operatively coupled to the dispensing portion and the communication portion. The control system receives a signal indicative of a consent by the user to receive or review the communicable content at least partially in exchange for the product, and after receipt of the signal, causes the communication portion to provide the communicable content to the user and causes the dispensing portion to dispense the product to the user. In further implementations, the apparatus may include a monitoring system operable to determine whether the user is receiving or reviewing the communicable content.

36 Claims, 10 Drawing Sheets

(56) References Cited

U.S. PATENT DOCUMENTS

| | | | |
|---|---|---|---|
| 4,383,210 A | | 5/1983 | Wilkinson |
| 4,532,418 A | | 7/1985 | Meese et al. |
| 4,667,141 A | | 5/1987 | Steele |
| 5,297,664 A | | 3/1994 | Tseng et al. |
| 5,317,691 A | | 5/1994 | Traeger |
| 5,327,066 A | | 7/1994 | Smith |
| 5,386,462 A | | 1/1995 | Schlamp |
| 5,544,784 A | * | 8/1996 | Malaspina ............... G07F 7/06 221/135 |
| 5,563,491 A | | 10/1996 | Tseng |
| 5,569,993 A | | 10/1996 | Keith |
| 5,744,933 A | | 4/1998 | Inoue et al. |
| 5,812,643 A | | 9/1998 | Schelberg, Jr. et al. |
| 6,314,169 B1 | | 11/2001 | Schelberg, Jr. et al. |
| 6,450,407 B1 | | 9/2002 | Freeman et al. |
| 6,584,715 B2 | | 7/2003 | Fujii et al. |
| 6,658,323 B2 | * | 12/2003 | Tedesco et al. ...... G06Q 20/387 700/236 |
| 7,761,307 B2 | | 7/2010 | Ochi et al. |
| 7,861,927 B2 | * | 1/2011 | DeGironemo ........ G07F 11/002 235/381 |
| 7,996,238 B2 | * | 8/2011 | Ochi ...................... G06Q 40/00 705/1.1 |
| 8,751,038 B2 | * | 6/2014 | Hyde ...................... G07F 9/023 700/237 |
| 8,774,963 B2 | * | 7/2014 | Signorelli et al. .... G07F 11/002 700/238 |

\* cited by examiner

VENDING DEVICES HAVING AD-WATCHING AS CONSIDERATION

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/136,504, entitled "VENDING DEVICES HAVING AD-WATCHING AS CONSIDERATION", naming Roderick A. Hyde, Muriel Y. Ishikawa, Edward K. Y. Jung, Jordin T. Kare, Royce A. Levien, Richard T. Lord, Robert W. Lord, Mark A. Malamud, John D. Rinaldo, Jr., Clarence T. Tegreene, Charles Whitmer, Lowell L. Wood, Jr., and Victoria Y. H. Wood as inventors, filed Aug. 1, 2011, which is currently co-pending, or is an application of which a currently co-pending application is entitled to the benefit of the filing date.

RELATED APPLICATIONS:

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

FIELD OF THE DISCLOSURE

The present disclosure relates generally to vending devices, and more specifically, to vending devices (e.g. electricity vending devices) having ad-watching as consideration.

BACKGROUND

Due to the ubiquitous nature of portable electrical devices, electricity vending devices are becoming widely available that enable users to recharge their portable devices while they are away from their home or office. Typically, such vending devices enable a user to recharge a portable electrical device (e.g. cell phone, portable computer, personal data assistant, music player, hearing aid, automobile, scooter, etc.) for a fee that may be paid in cash, credit card, debit card, payment tokens, or other payment method. Examples of such known vending devices for dispensing electricity include those devices disclosed in U.S. Pat. Nos. 5,812,643 and 6,314,169 issued to Schelberg et al., U.S. Pat. No. 5,327,066 issued to Smith, U.S. Pat. No. 5,297,664 issued to Tseng et al., and U.S. Pat. No. 4,184,580 Although desirable results have been achieved using conventional vending devices, there is room for improvement.

SUMMARY

The present disclosure teaches systems and methods for vending devices having ad-watching as consideration. For example, in at least some implementations, a vending apparatus includes a dispensing portion operable to dispense a product (e.g. electricity) to a user; a communication portion operable to provide a communicable content (e.g. an advertisement) to the user; and a control system operatively coupled to the dispensing portion and the communication portion. The control system is operable to: receive a signal indicative of a consent by the user to at least one of receive or review the communicable content at least partially in exchange for the product; and after receipt of the signal, to cause the communication portion to provide the communicable content to the user and to cause the dispensing portion to dispense the product to the user.

In further implementations, the apparatus includes a monitoring system operatively coupled to the control system and operable to sense the user. For example, in some implementations, the monitoring system may be operable to determine whether the user is at least one of facing or watching a display screen of the communication system. In further implementations, the monitoring system may be operable to determine whether the user is at least one of receiving or reviewing the communicable content from the communication system.

In other implementations, a method includes receiving a consent signal indicative of a consent by a user to at least one of receive or review a communicable content (e.g. an advertisement) at least partially in exchange for a product (e.g. electricity); after receiving the consent signal, providing the communicable content to the user; and at least one of after or simultaneously with the providing of the communicable content to the user, dispensing the product to the user.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

DETAILED DESCRIPTION

Techniques for vending devices, and more specifically, to vending devices (e.g. electricity vending devices) having ad-watching as consideration will now be disclosed. In the following detailed description, many specific details of certain implementations are described and shown in FIGS. 1 through 11 to provide a thorough understanding of such implementations. One skilled in the art will understand, however, that the present disclosure may have other possible implementations, and that such other implementations may be practiced with or without some of the particular details set forth in the following description.

In the following discussion, exemplary vending devices for implementing one or more of the teachings of the present disclosure are described. Next, exemplary flow charts showing methods of operating such vending devices in accordance with one or more of the teachings of the present disclosure are described.

Exemplary Environment

Figure 1:
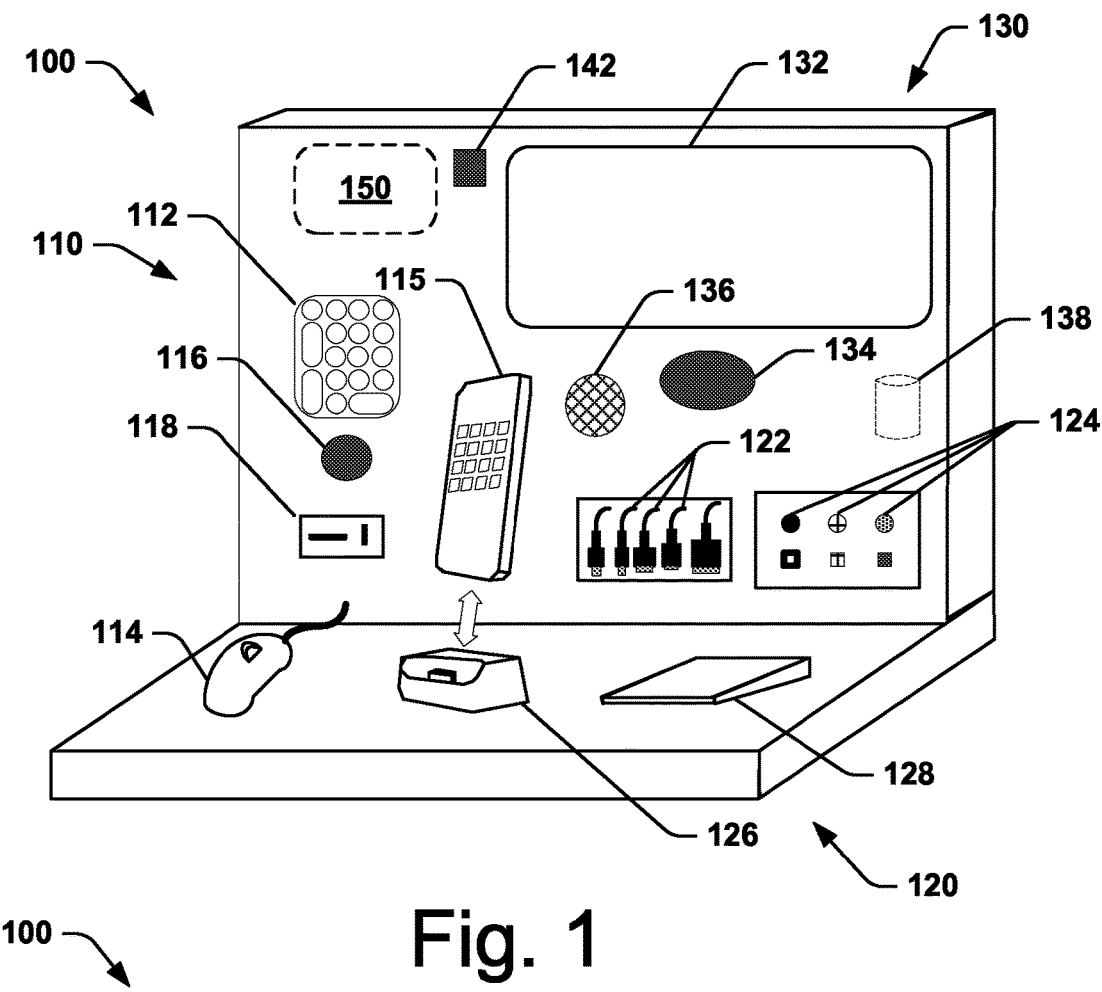
FIG. 1 is an isometric view of a representative electricity vending device in accordance with an implementation of the present disclosure.
Figure 2:
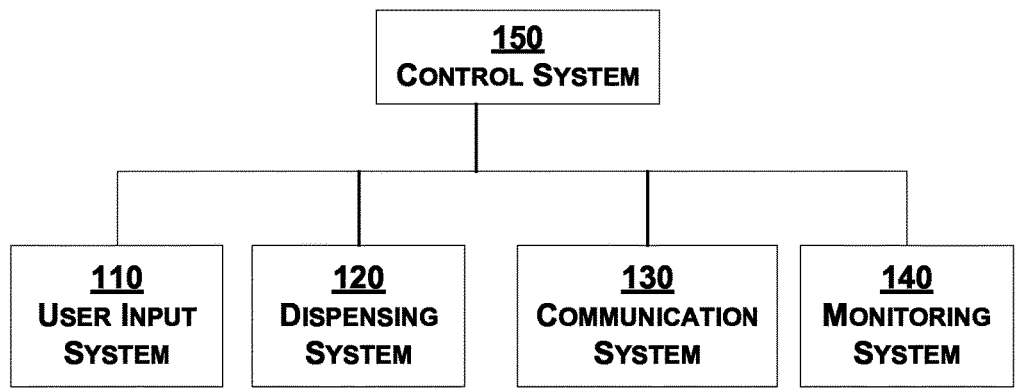
FIG. 2 is a block schematic view of the representative electricity vending device of FIG. 1.

FIG. 1 is a isometric view of a representative electricity vending device 100 in accordance with an implementation of the present disclosure. FIG. 2 is a block schematic view of the representative vending device 100 of FIG. 1. In this implementation, the vending device 100 includes a user input system 110, a dispensing system 120, a communication system 130, a monitoring system 140, and a control system 150. It will be appreciated that, in alternate embodiments, one or more of these systems may optionally be eliminated or combined with one or more other systems to form further vending device embodiments in accordance with the present disclosure.

The user input system 110 may include one or more input devices that enable a user of the vending device 100 to provide any desired inputs to the vending device 100. For example, in some implementations, the user input system 110 may include one or more of a keypad 112, a mouse 114, a microphone 116, or any other suitable devices for inputting information or data to the electricity vending device 100. Information provided by a user to the electricity vending device 100 via the user input system 110 may include, for example, one or more of an indication that the user desires to charge a rechargeable device 115, an indication of the type of device that is to be recharged (e.g. cellular telephone, portable computer, personal data assistant, music player, hearing aid, automobile, scooter, etc.), any other identifying information about the rechargeable device (e.g. manufacturer, model number, year, battery type, etc.), any other identifying information about the user (e.g. name, demographic information, etc.), or any other suitable information as described more fully below.

Similarly, in some implementations, the user input system 110 may also include a consideration input device 118. The consideration input device 118 may enable a user to pay a fee that may be paid in cash, credit card, debit card, payment tokens, or other suitable payment method. The components and operational aspects of the consideration input device 118 are generally known and, for the sake of brevity, will not be described in detail herein.

The dispensing system 120 is configured to dispense a product (e.g. electricity) to a user. More specifically, the dispensing system 120 may provide suitable recharging power from a power source (e.g. an electrical outlet, a generator, a battery, etc.) (not shown) to the rechargeable device 118 that the user desires to recharge. The dispensing system 120 may be configured in numerous suitable ways. Examples of known vending devices for dispensing electricity include those devices disclosed in U.S. Pat. Nos. 5,812,643 and 6,314,169 issued to Schelberg et al., U.S. Pat. No. 5,327,066 issued to Smith, U.S. Pat. No. 5,297,664 issued to Tseng et al., and U.S. Pat. No. 4,184,580, which patents are incorporated herein by reference.

The dispensing system 120 may include a wide variety of interface devices that are configured to engage with and provide recharging power to a wide variety of rechargeable devices. For example, as shown in FIG. 1, such interface devices may include one or more power cords 122 (e.g. power cords customary to different makes and/or models of rechargeable devices, etc.), receptacles or outlets 124 for receiving power cords (e.g. receptacles or outlets customary to different makes and/or models of rechargeable devices, customary to different countries, or for providing power having different voltage, phase, or frequency characteristics, etc.), cradles 126, inductive charging devices 128 (e.g. products such as the QI ENERGIZER™ inductive charger commercially-available from Eveready Battery Company, Inc., products incorporating WITRICITY™ technology developed by the Massachusetts Institute of Technology, products complying with standards promulgated by the Wireless Power Consortium, products incorporating or consistent with AVCON technology by Avcon, Inc., products incorporating or consistent with Magne Charge technology by Delco Electronics, Inc., etc.), or any other suitable interface devices. Additional functions, and operational aspects of the dispensing system 120 are described below.

The communication system 130 is configured to provide visual and/or audio content (referred to herein as "audio-visual" or "AV" content) to a user, and may generally includes a display screen 132, an audio speaker 134, and an antenna 136. The communication system 130 may receive audio-visual content to provide to a user from a variety of sources, including, for example, from a storage component 138, from an external source (e.g. cable, Internet, wireless signals, intranet, etc.) (not shown), from the control system 150 (or other portion of the electricity vending device 100), or from any other suitable source. Additional functions and operational aspects of the communication system 130 are described below.

As further shown in FIGS. 1 and 2, in at least some embodiments, the electricity vending device 100 may include the monitoring system 140. In this embodiment, the monitoring system 140 includes a sensor 142 that is configured to detect a user proximate the electricity vending device 100. The sensor 142 may operate in cooperation with the control system 150, or may be configured with its own processing components and logic to perform the desired functionalities described more fully below. For example, in some implementations, the monitoring system 140 may be configured to detect the presence of a user, while in further implementations, the sensor 142 may be configured to determine whether the user is facing or watching the display screen 132. A variety of suitable sensing technologies may be included in the monitoring system 140, including, for example, infrared-light-based sensing technologies (e.g. products incorporating or consistent with KINECT™ sensing technologies by Microsoft Corporation, sensing technologies by PrimeSense, Canesta, etc.), visible-light-based sensing technologies (e.g. cameras, photodiodes, etc.), audio or acoustic-based sensing technologies (e.g. microphones, etc.), mechanically-based sensing technologies (e.g. pressure sensors, springs, etc.), or any other suitable sensing technologies.

It will be appreciated that the components of the electricity vending device 100 shown in FIGS. 1 and 2 are merely exemplary, and represent one possible implementation of an electricity vending device in accordance with the present disclosure. The various components of the electricity vending device 100 may communicate and exchange information as needed to perform the functions and operations described herein. More specifically, in various implementations, each of the components of the electricity vending device 100 may be implemented using software, hardware, firmware, or any suitable combinations thereof. Similarly, one or more of the components of the electricity vending device 100 may be combined, or may be divided or separated into additional components, or additional components may be added, or one or more of the components may simply be eliminated, depending upon the particular requirements or specifications of the operating environment. Additional functions and operational aspects of the components of the electricity vending device 100 are described more fully below.

Figure 3:
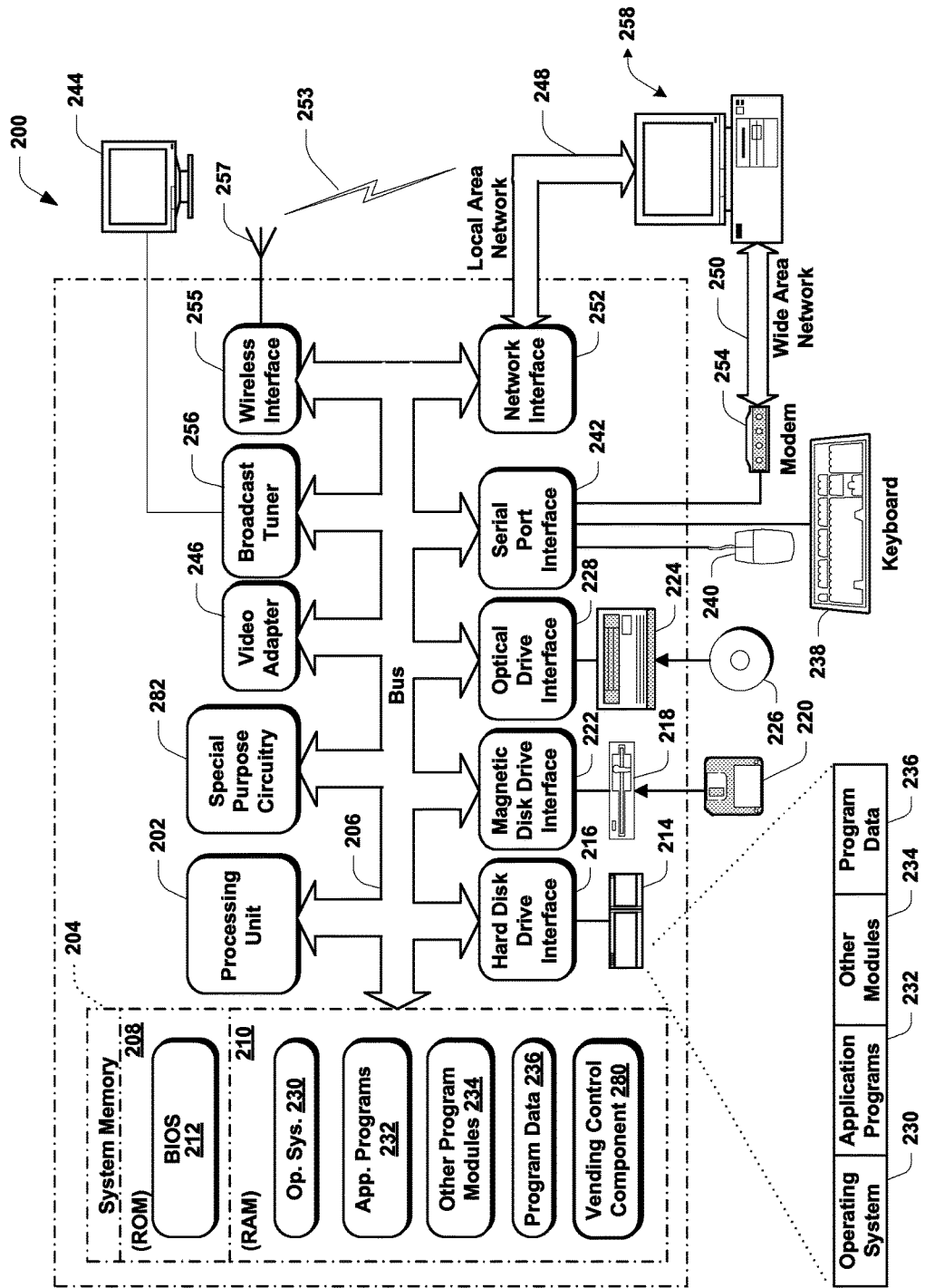
FIG. 3 is a schematic view of a representative computing device that may be used in an electricity vending device in accordance with an implementation of the present disclosure.

In some implementations, one or more of the components (e.g. the user input system 110, the dispensing system 120, the communication system 130, the monitoring system 140, or the control system 150,) of the exemplary electricity vending device 100 shown in FIGS. 1 and 2 may be at least partially implemented using a computing device. For example, FIG. 3 is a schematic view of an exemplary computing device 200 configured to operate in accordance with an implementation of the present disclosure. As described below, the computing device 200 can be configured to perform one or more of the functions and operations associated with the electricity vending device 100 shown in FIGS. 1 and 2.

As shown in FIG. 3, in some implementations, the computing device 200 may include one or more processors (or processing units) 202, special purpose circuitry 282, a memory 204, and a bus 206 that couples various system components, including the memory 204, to the one or more processors 202 and special purpose circuitry 282. The bus 206 represents one or more of any of several types of bus structures, including a memory bus or memory controller, a peripheral bus, an accelerated graphics port, and a processor or local bus using any of a variety of bus architectures. In this implementation, the memory 204 includes read only memory (ROM) 208 and random access memory (RAM) 210. A basic input/output system (BIOS) 212, containing the basic routines that help to transfer information between elements within the computing device 200, such as during start-up, is stored in ROM 208.

The exemplary computing device 200 further includes a hard disk drive 214 for reading from and writing to a hard disk (not shown), and is connected to the bus 206 via a hard disk driver interface 216 (e.g., a SCSI, ATA, or other type of interface). A magnetic disk drive 218 for reading from and writing to a removable magnetic disk 220, is connected to the system bus 206 via a magnetic disk drive interface 222. Similarly, an optical disk drive 224 for reading from or writing to a removable optical disk 226 such as a CD ROM, DVD, or other optical media, connected to the bus 206 via an optical drive interface 228. The drives and their associated computer-readable media provide nonvolatile storage of computer readable instructions, data structures, program modules and other data for the computing device 200. Although the exemplary computing device 200 described herein employs a hard disk, a removable magnetic disk 220 and a removable optical disk 226, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 3, a number of program modules may be stored on the memory 204 (e.g. the ROM 208 or the RAM 210) including an operating system 230, one or more application programs 232, other program modules 234, and program data 236. Alternately, these program modules may be stored on other computer-readable media, including the hard disk, the magnetic disk 220, or the optical disk 226. For purposes of illustration, programs and other executable program components, such as the operating system 230, are illustrated in FIG. 3 as discrete blocks, although it is recognized that such programs and components reside at various times in different storage components of the computing device 200, and may be executed by the processor(s) 202 or the special purpose circuitry 282 of the computing device 200.

A user may enter commands and information into the computing device 200 through input devices such as a keyboard 238 and a pointing device 240. Other input devices (not shown) may include a microphone, joystick, game pad, satellite dish, scanner, or the like. These and other input devices are connected to the processing unit 202 and special purpose circuitry 282 through an interface 242 that is coupled to the system bus 206. A monitor 244 or other type of display device is also connected to the bus 206 via an interface, such as a video adapter 246. In addition to the monitor, the computing device 200 may also include other peripheral output devices (not shown) such as speakers and printers.

The computing device 200 may operate in a networked environment using logical connections to one or more remote computers (or servers) 258. Such remote computers (or servers) 258 may be a personal computer, a server, a router, a network PC, a peer device or other common network node, and may include many or all of the elements described above relative to computing device 200. The logical connections depicted in FIG. 3 may include one or more of a local area network (LAN) 248 and a wide area network (WAN) 250. Such networking environments are commonplace in offices, enterprise-wide computer networks, intranets, and the Internet. In this embodiment, the computing device 200 also includes one or more broadcast tuners 256. The broadcast tuner 256 may receive broadcast signals directly (e.g., analog or digital cable transmissions fed directly into the tuner 256) or via a reception device (e.g., via an antenna, a satellite dish, etc.).

When used in a LAN networking environment, the computing device 200 may be connected to the local network 248 through a network interface (or adapter) 252. When used in a WAN networking environment, the computing device 200 typically includes a modem 254 or other means for establishing communications over the wide area network 250, such as the Internet. The modem 254, which may be internal or external, may be connected to the bus 206 via the serial port interface 242. Similarly, the computing device 200 may exchange (send or receive) wireless signals 253 with one or more remote computers (or servers) 258, such as those operated by one or more of the data providers 110 and data consumers 170, using a wireless interface 255 coupled to a wireless communicator 257 (e.g., an antenna, a satellite dish, a transmitter, a receiver, a transceiver, a photoreceptor, a photodiode, an emitter, a receptor, etc.).

In a networked environment, program modules depicted relative to the computing device 200, or portions thereof, may be stored in the memory 204, or in a remote memory storage device. More specifically, as further shown in FIG. 3, a vending control component 280 may be stored in the memory 204 of the computing device 200. The vending control component 280 may include at least a portion (or all) of the control system 150 of FIGS. 1 and 2, or one or more portions (or all) of the other components of the electricity vending device 100. The vending control component 280 may be implemented using software, hardware, firmware, or any suitable combinations thereof. In cooperation with the other components of the computing device 200, such as the processing unit 202 or the special purpose circuitry 282, the vending control component 280 may be operable to perform one or more implementations of processes for vending in accordance with the present disclosure.

Exemplary Vending Processes

FIGS. 4 through 11 are flowcharts of vending processes in accordance with further implementations of the present disclosure. In the following description of exemplary vending processes, reference may be made to the specific components of the exemplary vending device described above and shown in FIGS. 1 through 3.

Figure 4:
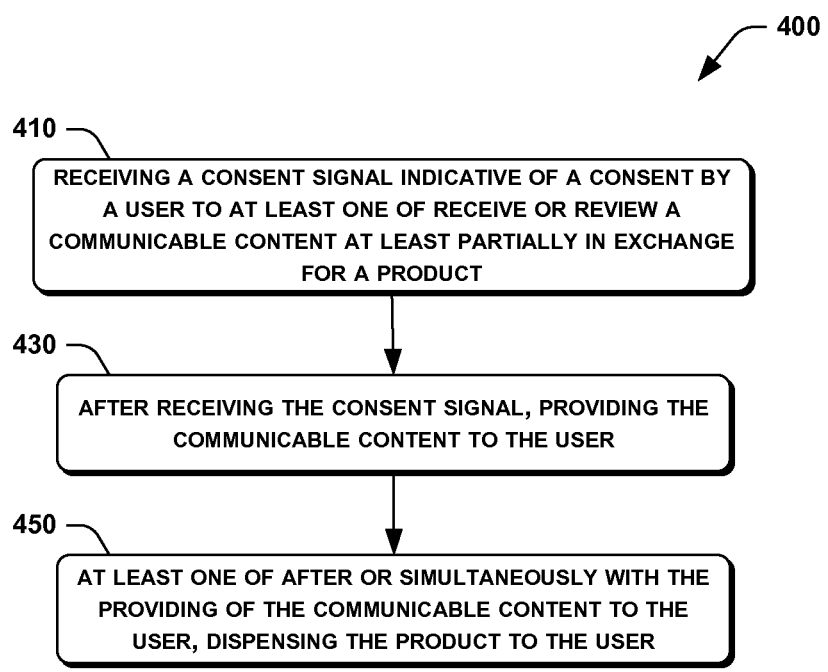
FIGS. 4 through 11 are flowcharts of vending processes in accordance with further implementations of the present disclosure.

For example, FIG. 4 shows a flowchart of a vending process 400 in accordance with an implementation of the present disclosure. In this implementation, the vending process 400 includes receiving a consent signal indicative of a consent by a user to at least one of receive or review a communicable content at least partially in exchange for a product at 410 (e.g. receiving a consent signal via keypad, keyboard, microphone, other user input device, etc.), after receiving the consent signal, providing the communicable content to the user at 430 (e.g. providing an audio-visual content via a display screen, a speaker, via upload to a user-provided device, etc.), and at least one of after or simultaneously with the providing of the communicable content to the user, dispensing the product to the user at 450 (e.g. dispensing electricity via plugs, sockets, cradles, inductive devices, etc.).

Figure 5:
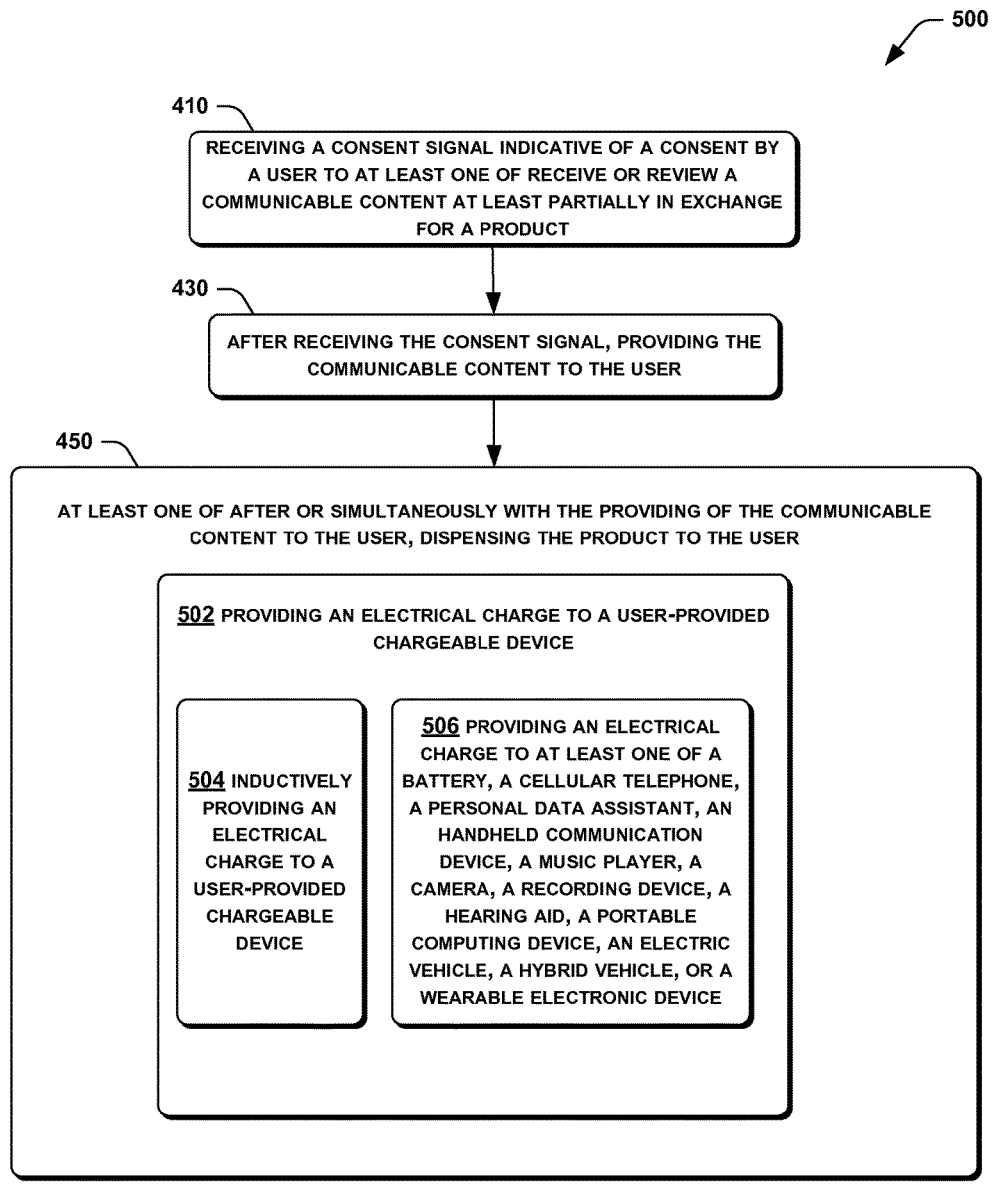

It will be appreciated that the above-noted portions 410, 430, 450 of the vending process 400 may be accomplished in a variety of ways. For example, FIG. 5 shows a flowchart of a vending process 500 in accordance with another implementation of the present disclosure. The vending process 500 includes the above-noted portions 410, 430, 450, however, as shown in FIG. 5, in some implementations, the dispensing the product to the user (at 450) may include providing an electrical charge to a user-provided chargeable device at 502 (e.g. dispensing via power cords, power outlets, cradles, inductive charging devices, etc.). In at least some implementations, the providing an electrical charge to a user-provided chargeable device at 502 may include inductively providing an electrical charge to a user-provided chargeable device at 504.

Similarly, in at least some implementations, the providing an electrical charge to a user-provided chargeable device at 502 may include providing an electrical charge to at least one of a battery, a cellular telephone, a personal data assistant, an handheld communication device, a music player, a camera, a recording device, a hearing aid, a portable computing device, an electric vehicle, a hybrid vehicle, or a wearable electronic device at 506.

Figure 6:
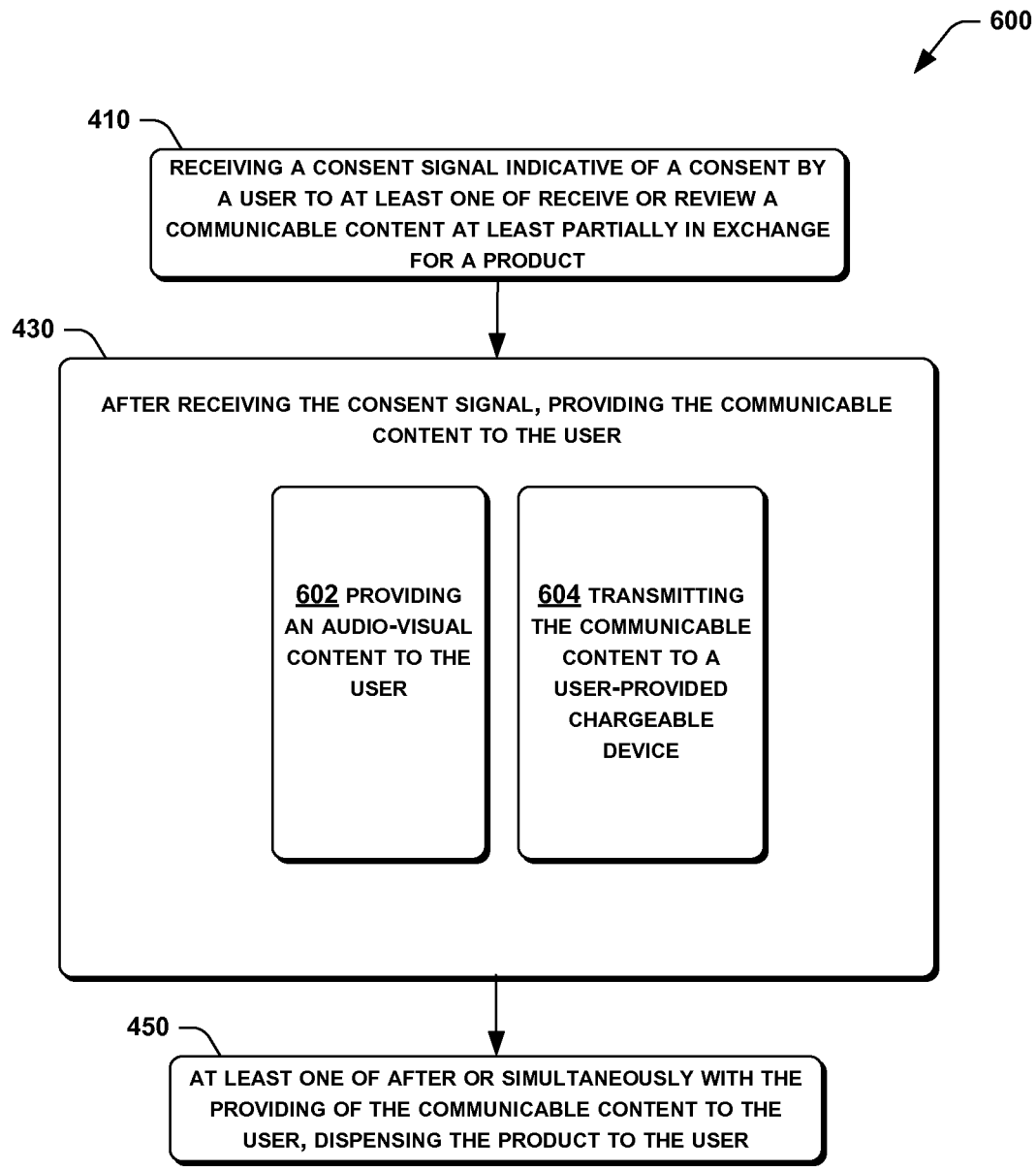

FIG. 6 shows a flowchart of a vending process 600 in accordance with another implementation of the present disclosure. The vending process 600 includes the above-noted portions 410, 430, 450, however, as shown in FIG. 6, in some implementations, the providing the communicable content to the user (at 430) may include providing an audio-visual content to the user at 602 (e.g. displaying a television-like advertisement via a display screen and audio speaker, etc.). In further implementations, the providing the communicable content to the user (at 430) may include transmitting the communicable content to a user-provided chargeable device at 604 (e.g. uploading an advertisement or info-mercial onto a user-provided communication device, uploading a theme song onto a portable computing device, etc.).

Figure 7:
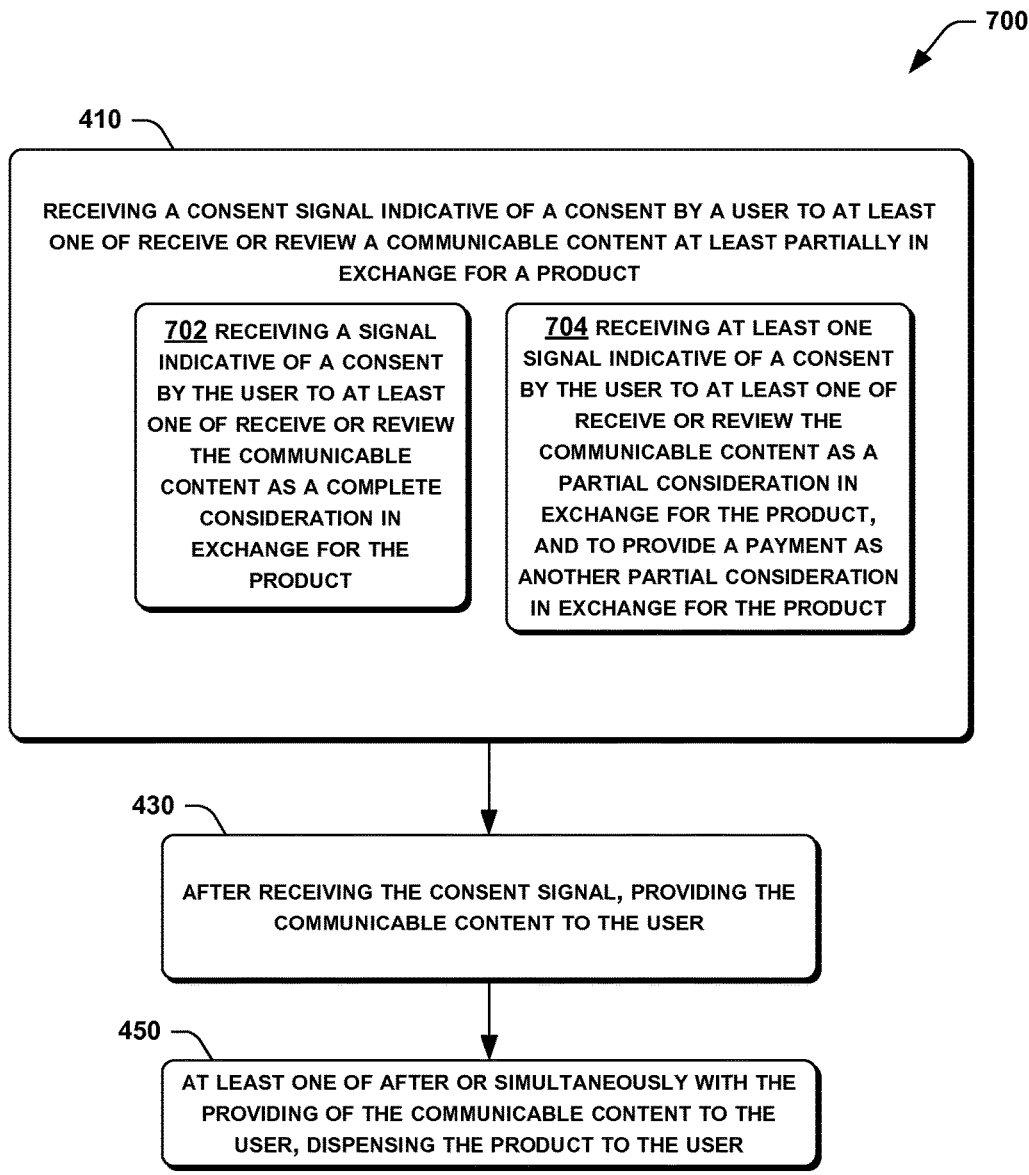

FIG. 7 shows a flowchart of a vending process 700 in accordance with another implementation of the present disclosure. Again, the vending process 700 includes the above-noted portions 410, 430, 450, however, as shown in FIG. 7, in some implementations, the receiving a consent signal indicative of a consent by a user to at least one of receive or review a communicable content at least partially in exchange for a product (at 410) may include receiving a signal indicative of a consent by the user to at least one of receive or review the communicable content as a complete consideration in exchange for the product at 702 (e.g. user agrees to watch a five minute message in exchange for product, user agrees to answer a consumer survey in exchange for electrical charge, etc.). In further implementations, the receiving a consent signal indicative of a consent by a user to at least one of receive or review a communicable content at least partially in exchange for a product (at 410) may include receiving at least one signal indicative of a consent by the user to at least one of receive or review the communicable content as a partial consideration in exchange for the product, and to provide a payment as another partial consideration in exchange for the product at 704 (e.g. user agrees to watch an advertisement in exchange for a discounted price on the product, user agrees to listen to info-mercial to receive product at half the usual price, etc.).

Figure 8:
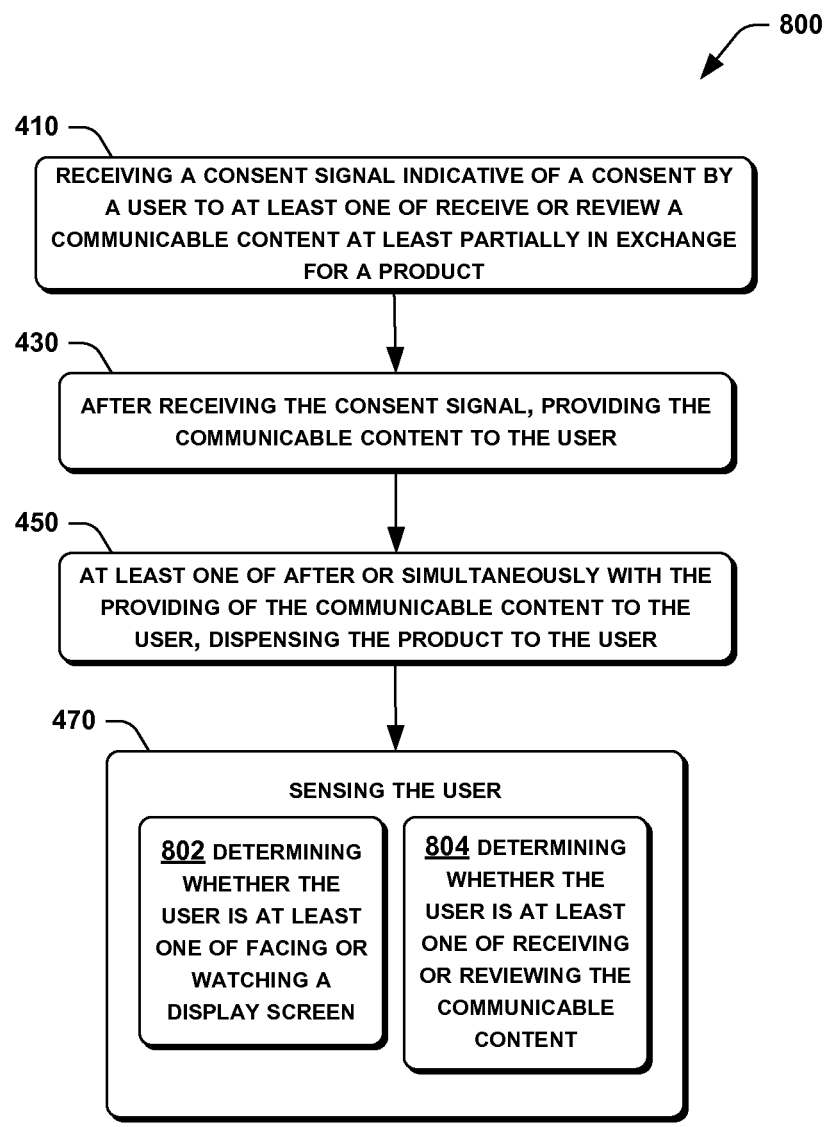

FIG. 8 shows a flowchart of another vending process 800 in accordance with another implementation of the present disclosure. In this implementation, the vending process 800 includes the above-noted portions 410, 430, 450, and further includes sensing the user at 470. In some implementations, sensing the user (at 470) may include determining whether the user is at least one of facing or watching a display screen at 802 (e.g. sensing which direction the user is facing, sensing where the user's eyes are directing, etc.). In further implementations, sensing the user (at 470) may include determining whether the user is at least one of receiving or reviewing the communicable content at 804 (e.g. sensing whether an upload to a user-provided phone is being viewed or played, etc.). In still further implementations, sensing the user (at 470) may include determining that the user is not at least one of receiving or reviewing the communicable content at 806 (e.g. sensing that the user is not facing a display screen, determining that the user had departed from the area, determining that the user is speaking, etc.).

Figure 9:
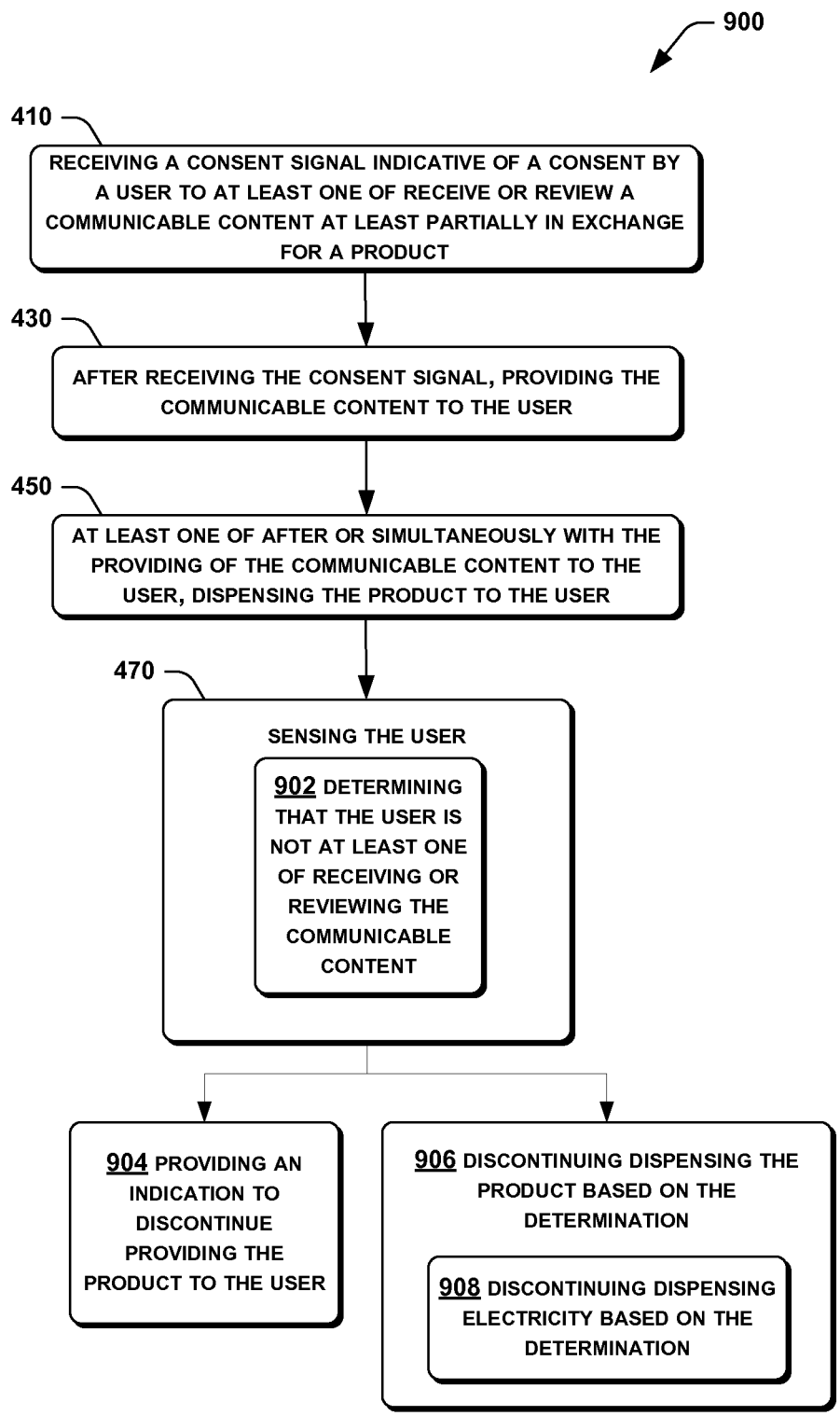

FIG. 9 shows a flowchart of a vending process 900 in accordance with another implementation of the present disclosure. Again, the vending process 900 includes the above-noted portions 410, 430, 450, 470 however, as shown in FIG. 9, in some implementations, the sensing the user (at 470) may include determining that the user is not at least one of receiving or reviewing the communicable content at 902. The vending process 900 may further include providing an indication to discontinue providing the product to the user at 904 (e.g. transmitting a signal from a monitoring system to a control system to cease providing electricity, issuing a warning that providing a product will cease, etc.) or may further include discontinuing dispensing the product based on the determination at 906 (e.g. terminating charging, not initiating charging, etc.), or both (904 and 906). More specifically, in some implementations, wherein dispensing the product to the user (at 450) includes dispensing electricity to charge a user-provided chargeable device, the discontinuing dispensing the product based on the determination (at 906) may include discontinuing dispensing electricity based on the determination at 908.

Figure 10:
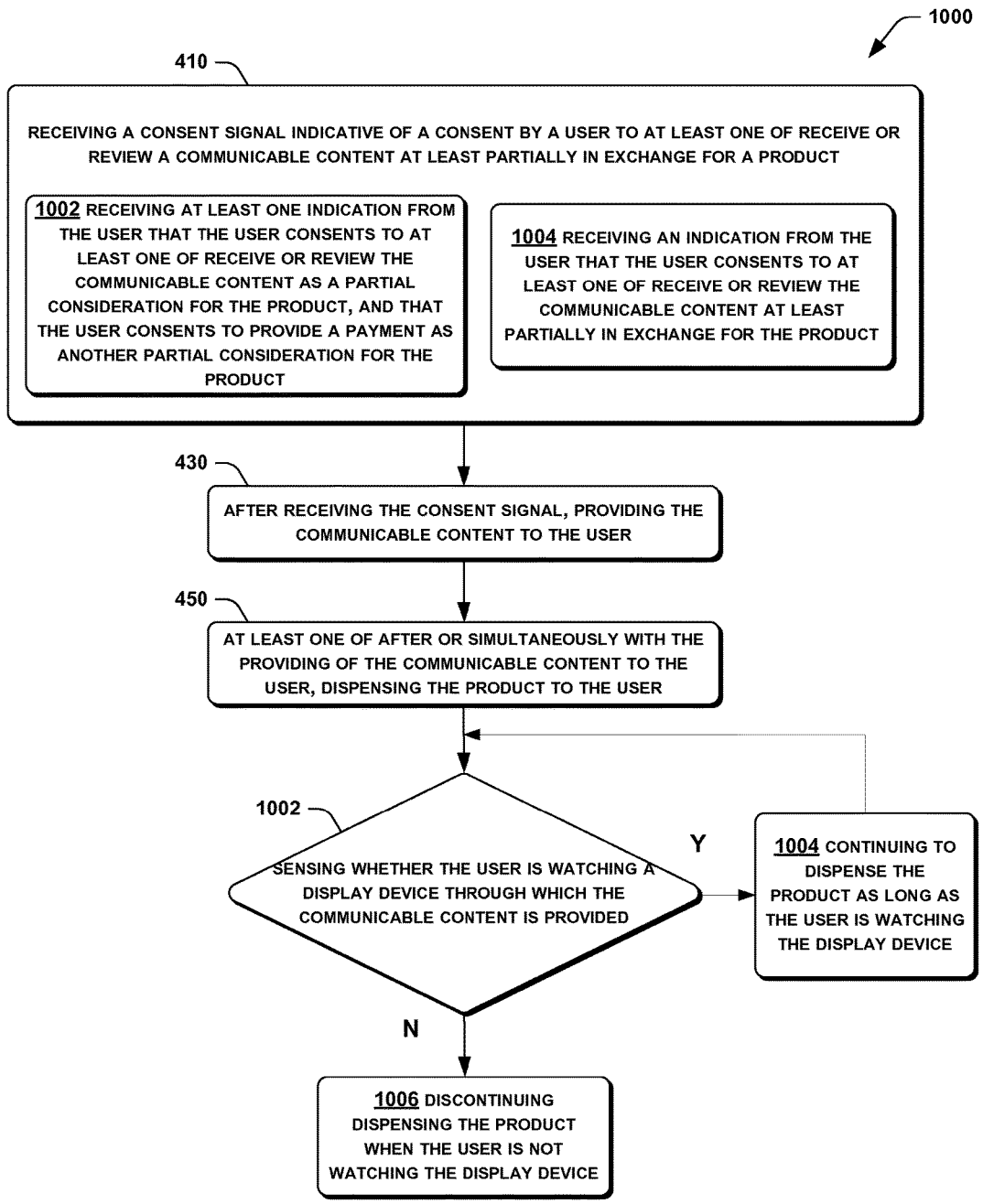

FIG. 10 shows a flowchart of a vending process 1000 in accordance with another implementation of the present disclosure. Again, the vending process 1000 includes the above-noted portions 410, 430, 450, however, as shown in FIG. 10, in some implementations, the receiving a consent signal indicative of a consent by a user to at least one of receive or review a communicable content at least partially in exchange for a product (at 410) may include receiving at least one indication from the user that the user consents to at least one of receive or review the communicable content as a partial consideration for the product, and that the user consents to provide a payment as another partial consideration for the product at 1002 (e.g. receiving signal indicating the user will observe advertisements and will pay 50% of usual price for product, receiving signal that user will watch ads and take a survey in exchange for product, etc.). In further implementations, the receiving a consent signal indicative of a consent by a user to at least one of receive or review a communicable content at least partially in exchange for a product (at 410) may include receiving an indication from the user that the user consents to at least one of receive or review the communicable content at least partially in exchange for the product at 1004 (e.g. receiving indication that user will read a brochure and provide comments in exchange for electricity, etc.).

As further shown in FIG. 10, the vending process 1000 may further include sensing whether the user is watching a display device through which the communicable content is provided at 1002 (e.g. determining whether the user is facing a television, sensing eye movement indicative of reading text on a display, etc.). If yes, then the vending process 100 may include continuing to dispense the product as long as the user is watching the display device at 1004, and returning to the sensing whether the user is watching a display device through which the communicable content is provided at 1002. If not, the vending process 100 may include discontinuing dispensing the product when the user is not watching the display device at 1006.

Figure 11:
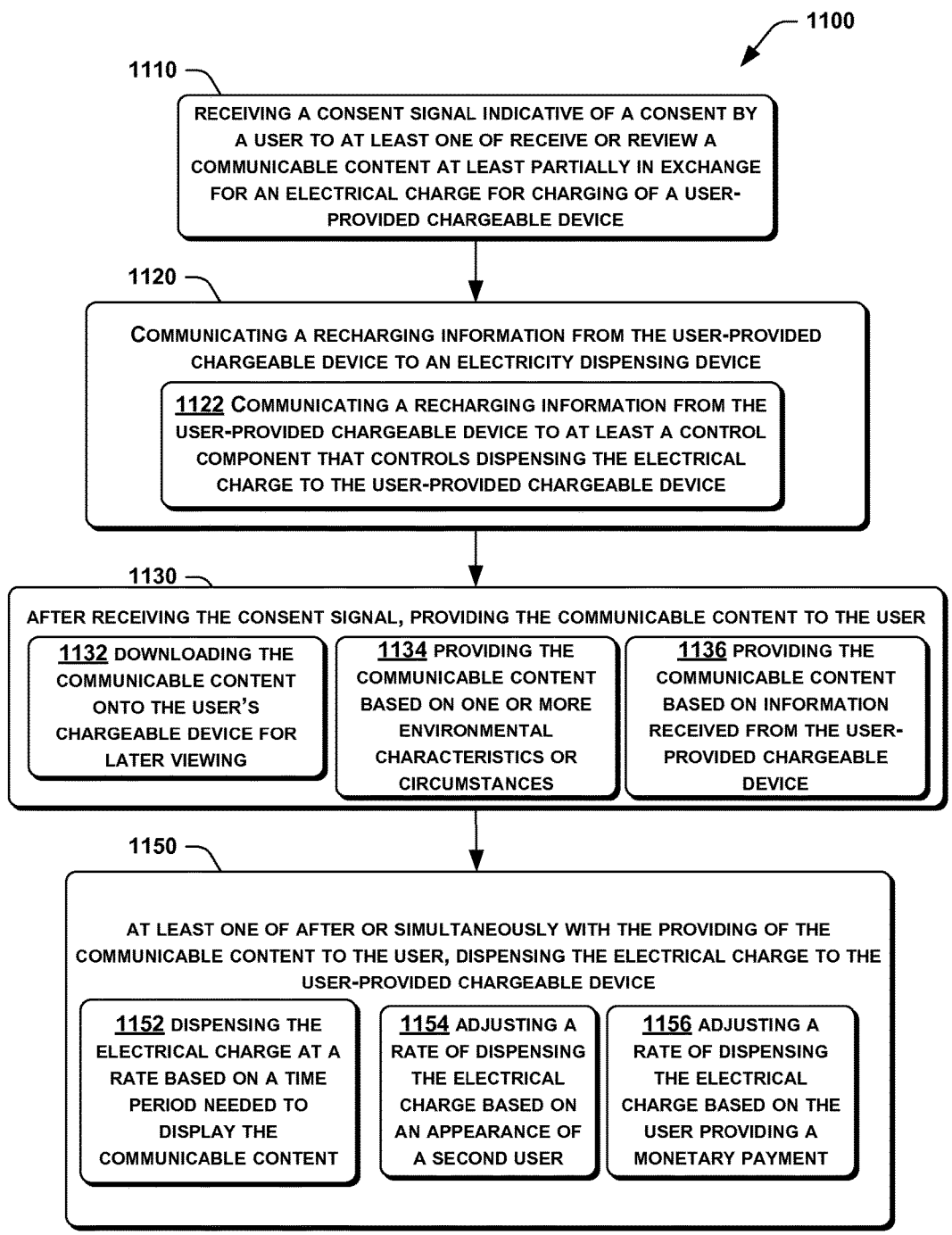

FIG. 11 shows a flowchart of a vending process 1100 in accordance with an implementation of the present disclosure. In this implementation, the vending process 1100 includes receiving a consent signal indicative of a consent by a user to at least one of receive or review a communicable content at least partially in exchange for a product at 1110 (e.g. receiving a consent signal via keypad, keyboard, microphone, other user input device, etc.), communicating a recharging information from the user-provided chargeable device to an electricity dispensing device at 1120, after receiving the consent signal, providing the communicable content to the user at 1130 (e.g. providing an audio-visual content via a display screen, a speaker, via upload to a user-provided device, etc.), and at least one of after or simultaneously with the providing of the communicable content to the user, dispensing the product to the user at 1140 (e.g. dispensing electricity via plugs, sockets, cradles, inductive devices, etc.).

As further shown in FIG. 11, in at least some embodiments, the communicating a recharging information from the user-provided chargeable device to an electricity dispensing device (at 1120) may include communicating a recharging information from the user-provided chargeable device to at least a control component that controls dispensing the electrical charge to the user-provided chargeable device at 1122. For example, in some implementations, the vending device 100 may communicate with (or "read" from) the rechargeable device 115 recharging information regarding a quantity, quality, type, or other characteristic of electricity needed by the rechargeable device 115. This may be accomplished by the dispensing system 120, the user-input system 110, or any other portion of the electricity vending device 100. For example, the recharging information may include a specified quantity of volts needed to recharge, a recharge supply voltage, a recharge supply current, a recharge supply phase, or any other suitable recharging characteristics.

In addition, in at least some implementations, the after receiving the consent signal, providing the communicable content to the user (at 1130) may include downloading the communicable content onto the user's chargeable device for later viewing at 1132. For example, a vending device 100 may download ads (or other communicable content) to a user's cell phone (or other suitable chargeable device) so the ad will play later when the user uses cell phone.

With continued reference to FIG. 11, the at least one of after or simultaneously with the providing of the communicable content to the user, dispensing an electrical charge to the user-provided chargeable device (at 1150) may include dispensing the electrical charge at a rate based on a time period needed to display the communicable content at 1152.

For example, in some embodiments, the electricity vending device 100 may control recharge rate based on how long it wants to keep showing the user ads, not just on raw power-delivery requirements.

Similarly, the at least one of after or simultaneously with the providing of the communicable content to the user, dispensing an electrical charge to the user-provided chargeable device (at 1150) may include adjusting a rate of dispensing the electrical charge based on an appearance of a second user at 1154. For example, in some embodiments, the electricity vending device 100 can "release" user A quicker if user B is waiting. Alternately, the at least one of after or simultaneously with the providing of the communicable content to the user, dispensing an electrical charge to the user-provided chargeable device (at 1150) may include adjusting a rate of dispensing the electrical charge based on the user providing a monetary payment at 1156. For example, in some embodiments, the user can pay for electricity/downloads if he wants to be released faster.

As further shown in FIG. 11, in at least some implementations, the after receiving the consent signal, providing the communicable content to the user (at 1130) may include providing the communicable content based on one or more environmental characteristics or circumstances at 1134. For example, a vending device 100 may open-loop tailor ads/services based on location, time-of-day, etc.

Alternately, in at least some implementations, the after receiving the consent signal, providing the communicable content to the user (at 1130) may include providing the communicable content based on information received from the user-provided chargeable device at 1134. For example, a vending device 100 may closed-loop tailor the ads to the specific user. More specifically, the vending device 100 can read info from user's device to help it tailor ads to him. This can be direct from user's device, or via off-board database (e.g. just given user's ID). This may be done even if user only plugs in his power connection (e.g., by wirelessly detecting the device's IP, phone ESN, etc). In at least some implementations, the user may opt-out of this easily enough (e.g., turn off his phone). This whole tailoring/data-retrieval can be implicit, or by explicit permission (e.g. as part of price of free energy, because the user may want better-tailored ads, in exchange for additional services, etc.).

It should be appreciated that the particular embodiments of processes described herein are merely possible implementations of the present disclosure, and that the present disclosure is not limited to the particular implementations described herein and shown in the accompanying figures. For example, although implementations of systems and methods for vending devices having ad-watching as consideration have been discussed in this disclosure in terms of dispensing electricity (i.e. electricity vending devices), in alternate implementations, such systems and methods may be readily configured for vending of other types of products (e.g. water, light, heat, music, streaming content, news, information, fuel, gases, food, beverages, smokeable products, etc.).

In addition, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning. A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A vending apparatus, comprising:
   a dispensing portion operable to dispense a product to a user;
   a communication portion operable to provide a communicable content for outputting for at least one of viewing or hearing by the user;

a control system operatively coupled to the dispensing portion and the communication portion, the control system being operable to:
  signal the communication portion to provide the communicable content for outputting for at least one of viewing or hearing by the user and to signal the dispensing portion to dispense the product to the user; and
a monitoring system operatively coupled to the control system and operable to determine whether the user is at least one of facing or watching a display screen of the communication portion, wherein the control system is operable to control the dispensing portion to output the product when the monitoring system determines that the user is at least one of facing or watching the display screen to at least one of visibly or audibly perceive the communicable content.

2. The apparatus of claim 1, wherein the dispensing portion operable to dispense a product to a user comprises:
  a charging station operable to be operatively coupled with a user-provided chargeable device and to provide an electrical charge to the user-provided chargeable device, the user-provided chargeable device including at least one of a battery, a cellular telephone, a personal data assistant, an handheld communication device, a music player, a camera, a recording device, a hearing aid, a portable computing device, an electric vehicle, a hybrid vehicle, or a wearable electronic device.

3. The apparatus of claim 1, wherein the communication portion operable to provide a communicable content for outputting for at least one of viewing or hearing by the user comprises:
  an audio-visual system operable to broadcast an audio-visual content at least one of visibly or audibly for at least one of viewing or hearing by the user.

4. The apparatus of claim 1, wherein the communication portion operable to provide a communicable content for outputting for at least one of viewing or hearing by the user comprises:
  a transmission component operable to transmit the communicable content to a user-provided chargeable device for outputting at least one of visibly or audibly for at least one of viewing or hearing by the user.

5. The apparatus of claim 1, wherein the control system operable to receive a signal indicative of a consent by the user to at least one of receive or review the communicable content at least partially in exchange for the product comprises:
  at least one of:
  a control system portion operable to receive a signal indicative of a consent by the user to at least one of receive or review the communicable content as a complete consideration in exchange for the product; or
  a control system operable to receive a signal indicative of a consent by the user to at least one of receive or review the communicable content as a partial consideration in exchange for the product, and to receive a payment as another partial consideration in exchange for the product.

6. The apparatus of claim 1, wherein the dispensing of the product by the dispensing portion being co-extensive in time with the communicable content being broadcast at least one of visibly or audibly for at least one of viewing or hearing by the user.

7. The apparatus of claim 1, wherein the control system is further operable to receive a consent signal indicative of a consent by the user to at least one of receive or review the communicable content at least partially in exchange for the product; and after receipt of the consent signal, to signal the communication portion to provide the communicable content.

8. The apparatus of claim 1, wherein the monitoring system is further operable to determine whether the user is proximately positioned to at least one of view or hear the communicable content broadcast from the communication portion.

9. The apparatus of claim 1, wherein the monitoring system is further operable to determine that the user is not at least one of receiving or viewing the communicable content from the communication portion, and to provide an indication to discontinue providing the communicable content to the user in response thereto.

10. The apparatus of claim 1, wherein at least one of the monitoring system or the control system is operable to determine whether the user is watching the display device.

11. The apparatus of claim 1, wherein:
  at least one of the control system or the dispensing portion is operable to discontinue dispensing the product based on the determination whether the user is at least one of facing or watching the display device.

12. The apparatus of claim 1, wherein the dispensing portion is operable to dispense electricity to recharge a user-provided rechargeable device, and wherein:
  at least one of the control system or the dispensing portion is operable to discontinue dispensing electricity based on the determination whether the user is at least one of facing or watching the display device.

13. The apparatus of claim 1, further comprising:
  a user input portion operatively coupled to the control system and operable to receive an input from the user.

14. The apparatus of claim 13, wherein the user input portion operatively coupled to the control system and operable to receive an input from the user comprises:
  a user input portion operable to receive an indication from the user that the user consents to at least one of receive or review the communicable content as a partial consideration for the product, and that the user consents to provide a payment as another partial consideration for the product.

15. The apparatus of claim 13, wherein the user input portion operatively coupled to the control system and operable to receive an input from the user comprises:
  a user input portion operable to receive an indication from the user that the user consents to at least one of receive or review the communicable content at least partially in exchange for the product.

16. The apparatus of claim 1, wherein the product includes an electrical charge dispensed to a chargeable device.

17. A vending system, comprising:
  circuitry for providing a communicable content for outputting via a display screen for at least one of viewing or hearing by the user;
  circuitry for determining whether the user is at least one of facing or watching a display screen; and
  circuitry for dispensing the product to the user when the circuitry for determining determines that the user is at least one of facing or watching the display screen,
  wherein at least one of the circuitry for receiving, the circuitry for providing, the circuitry for determining, or the circuitry for dispensing is at least partially implemented using one or more processing devices.

18. The system of claim 17, wherein circuitry for dispensing the product to the user, the dispensing of the product by the dispensing portion being co-extensive in time with the communicable content being broadcast at least one of visibly or audibly for at least one of viewing or hearing by the user comprises:
    circuitry for providing an electrical charge to a user-provided chargeable device.

19. The system of claim 18, wherein circuitry for providing an electrical charge to a user-provided chargeable device comprises:
    circuitry for inductively providing an electrical charge to a user-provided chargeable device.

20. The system of claim 18, wherein circuitry for providing an electrical charge to a user-provided chargeable device comprises:
    circuitry for providing an electrical charge to at least one of a battery, a cellular telephone, a personal data assistant, an handheld communication device, a music player, a camera, a recording device, a hearing aid, a portable computing device, an electric vehicle, a hybrid vehicle, or a wearable electronic device.

21. The system of claim 17, wherein circuitry for providing the communicable content for outputting for at least one of viewing or hearing by the user after receiving the consent signal comprises:
    circuitry for providing an audio-visual content for outputting for at least one of viewing or hearing by the user.

22. The system of claim 17, wherein circuitry for providing the communicable content for outputting for at least one of viewing or hearing by the user after receiving the consent signal comprises:
    circuitry for transmitting the communicable content to a user-provided chargeable device for outputting for at least one of viewing or hearing by the user.

23. The system of claim 17, wherein circuitry for receiving a consent signal indicative of a consent by a user to at least one of receive or review a communicable content at least partially in exchange for a product comprises:
    circuitry for receiving a signal indicative of a consent by the user to at least one of receive or review the communicable content as a complete consideration in exchange for the product.

24. The system of claim 17, wherein circuitry for receiving a consent signal indicative of a consent by a user to at least one of receive or review a communicable content at least partially in exchange for a product comprises:
    circuitry for receiving at least one signal indicative of a consent by the user to at least one of receive or review the communicable content as a partial consideration in exchange for the product, and to provide a payment as another partial consideration in exchange for the product.

25. The system of claim 17, wherein the circuitry for dispensing dispenses the product co-extensive in time with the communicable content being broadcast at least one of visibly or audibly for at least one of viewing or hearing by the user.

26. The system of claim 17, wherein the circuitry for providing the communicable content is further operable to receive a consent signal indicative of a consent by the user to at least one of receive or review the communicable content at least partially in exchange for the product, and to provide the communicable content after receipt of the consent signal.

27. The system of claim 17, wherein circuitry for determining whether the user is at least one of facing or watching a display screen comprises:
    circuitry for determining whether the user is proximately positioned to at least one of visibly or audibly perceive the communicable content.

28. The system of claim 17, wherein circuitry for determining whether the user is at least one of facing or watching a display screen comprises:
    circuitry for determining that the user is not present to at least one of visibly or audibly perceive the communicable content.

29. The system of claim 28, further comprising:
    circuitry for providing an indication to discontinue providing the product to the user.

30. The system of claim 28, further comprising:
    circuitry for discontinuing dispensing the product based on the determination.

31. The system of claim 28, wherein circuitry for dispensing the product to the user comprising:
    circuitry for discontinuing dispensing electricity based on the determination.

32. The system of claim 17, further comprising circuitry for receiving a consent signal indicative of a consent by a user to at least one of receive or review a communicable content at least partially in exchange for a product.

33. The system of claim 32 wherein circuitry for receiving a consent signal indicative of a consent by a user to at least one of receive or review a communicable content at least partially in exchange for a product comprises:
    circuitry for receiving an indication from the user that the user consents to at least one of receive or review the communicable content at least partially in exchange for the product.

34. The system of claim 33, further comprising:
    circuitry for sensing whether the user is watching a display device through which the communicable content is provided; and
    circuitry for continuing to dispense the product as long as the user is watching the display device.

35. The system of claim 34, further comprising:
    circuitry for discontinuing dispensing the product when the user is not watching the display device.

36. One or more computer-readable non-transitory media comprising:
    one or more instructions configured for providing a communicable content for outputting via a display screen for at least one of viewing or hearing by the user;
    one or more instructions configured for determining whether the user is at least one of facing or watching a display screen, and
    one or more instructions configured for dispensing the product to the user when the one or more instructions configured for determining determine that the user is at least one of facing or watching the display screen.

\* \* \* \* \*